J. C. KEMPTON.
Dyeing Vat.
No. 8,334.  Patented Sept. 2, 1851.
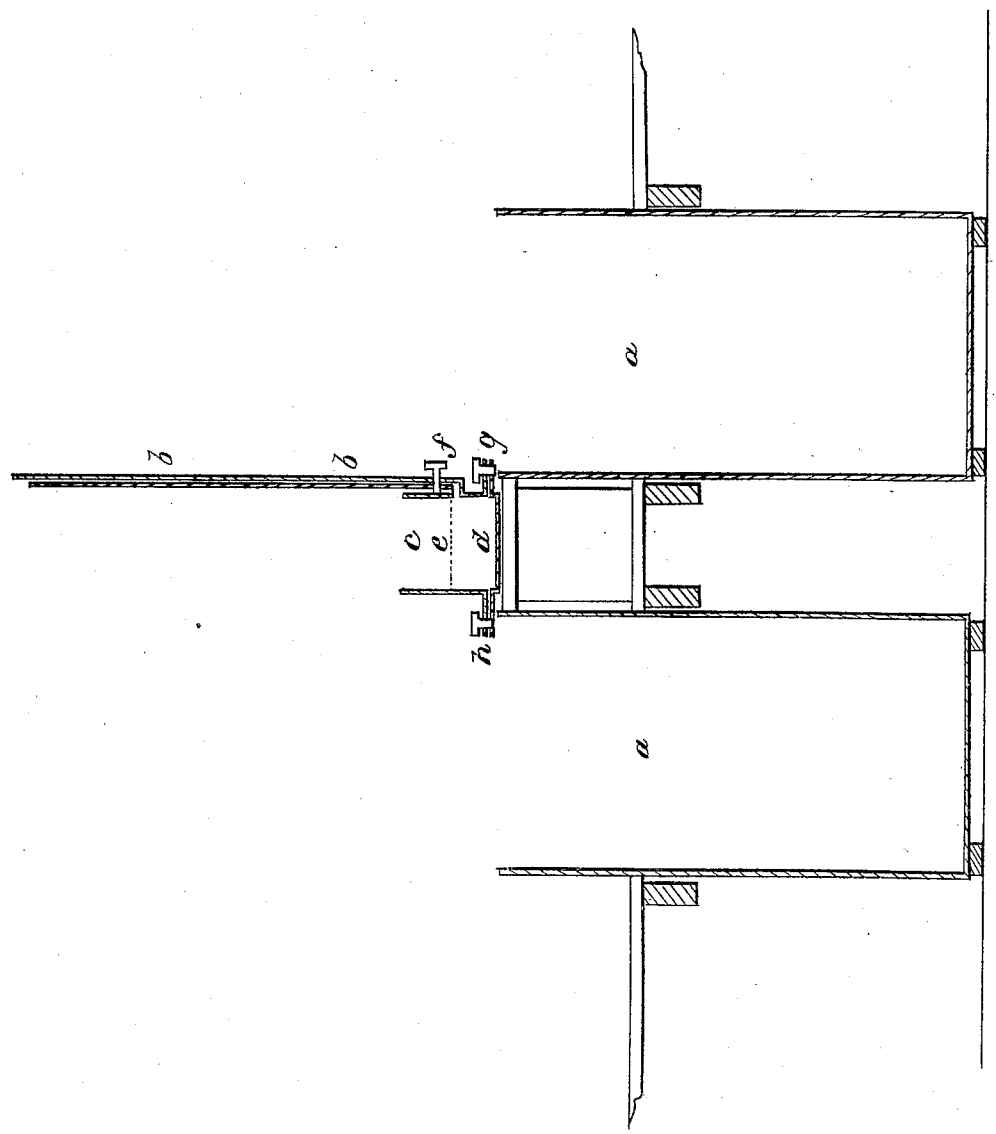

UNITED STATES PATENT OFFICE.

JAMES C. KEMPTON, OF MANAYUNK, PENNSYLVANIA.

DRYING AND OXIDIZING COLORED GOODS.

Specification of Letters Patent No. 8,334, dated September 2, 1851.

*To all whom it may concern:*

Be it known that I, JAMES C. KEMPTON, of Manayunk, county of Philadelphia, State of Pennsylvania, have invented a new and useful Improvement in Coloring Cotton, Wool, and other Substances with Indigo or other Coloring Matter.

In the usual method of coloring cotton wool with indigo it is usual to immerse a basket containing a quantity of cotton into the vat, and after remaining sufficiently long for the coloring matter to penetrate the mass the basket is withdrawn from the vat; and after being supported on the vat by timbers, a screw is brought to bear upon the cotton pressing out the liquor; after which the cotton is minutely opened and exposed to the air to oxidize the indigo and thus fasten the color. Several practical difficulties present themselves in the adoption of this plan; the pressure of the screw on such an elastic spongy mass in insufficient to force out all the liquor; thereby causing great waste of expensive coloring material. In addition to this difficulty the necessary delay that exists before the cotton is exposed to the oxygen of the atmosphere causes, much of the color to be so loose or fugitive as to fly off in the after process of washing.

My improvement by which I obviate these difficulties consists in applying the pressure of air for forcing out the liquor, and by passing a rapid current of air through the whole mass of cotton or other material immediately upon its removal from the vat, by which means the liquor is more thoroughly pressed out than by the old method, and the indigo so much more rapidly oxidized as to fasten it more thoroughly to the cotton; so that in the process of washing and after wear the color will remain much more permanently. The pressure of the air may be obtained by the use of an apparatus for forcing air on to, and through the cotton, or merely by the use of atmospheric pressure, which latter I have found to answer a good purpose.

My plan for applying atmospheric pressure is exhibited in the accompanying drawing.

$a$, $a$, vats containing the coloring matter for indigo blues; $b$, $b$, pipe connected with an air pump, and also with the lower section of the metallic vessel or extracting pan $c$, $d$.

The extracting pan has a perforated partition at $e$,—on to this the cotton or other material is placed upon the withdrawal from the vat. The action of the air pump causes an immediate pressure of the atmosphere upon the cotton or other material, thus forcing out the excess of liquor into the lower apartment of the extracting pan; the continued action of the air pump causes the air to pass rapidly through the entire mass of cotton, thus oxidizing the indigo and fastening the color upon the cotton.

By closing the cock $f$, and opening either of the cocks $g$, $g$, the extracted liquor will flow back into the vat. After which the cotton will be at once ready for a second immersion in the blue vat, or for washing.

What I claim is my invention is—

The aplication of atmospheric pressure or the mechanical pressure of air in the coloring of cotton wool or other substances; for removing the excess of liquor absorbed from the vat, and for oxidizing or fixing the color by its forced passage through the mass and by the use of apparatuses substantially such as herein described.

JAS. C. KEMPTON.

Witnesses:
THOMAS FERGUSON,
CLIFFORD SMITH, Jr.